X-RAY DIFFRACTION POWDER PATTERN OF CRYSTALLINE STRUCTURE FORMED BY HEATING $Na_2O$ (9–10 WT. %) AND $Al_2O_3$ (BALANCE) AT 1520°C FOR 17 HOURS.

$2\theta$ = ANGLE OF DIFFRACTION X2 AT X-RAY WAVE LENGTH OF 1.7902

X-RAY DIFFRACTION POWDER PATTERN OF CRYSTALLINE STRUCTURE FORMED BY HEATING $Na_2O$ (9–10 WT. %) AND $Al_2O_3$ AT 1650°C FOR 4 HOURS.

$2\theta$ = ANGLE OF DIFFRACTION AT X-RAY WAVE LENGTH OF 1.7902

United States Patent Office
3,468,719
Patented Sept. 23, 1969

3,468,719
SOLID STATE IONIC CONDUCTOR AND METHOD OF MAKING
Gerald J. Tennenhouse, Oak Park, Mich., assignor to Ford Motor Company, Dearborn, Mich., a corporation of Delaware
Filed Nov. 21, 1966, Ser. No. 595,979
Int. Cl. H01m 3/02; H01b 1/08
U.S. Cl. 136—153                                 12 Claims

ABSTRACT OF THE DISCLOSURE

Cationically-conductive polycrystalline objects are produced by intimately mixing aluminum oxide and sodium oxide, heating the mixed oxides at crystal forming temperature until the mixture has been converted to a first cationically-conductive crystalline composition, terminating the heating before this crystalline composition converts to a second crystalline composition, compressing the resultant crystals into an object of the desired shape and size, and sintering the resultant compressate at a temperature and for a time insufficient to effect conversion of the crystals to a second crystalline composition.

---

This invention relates to an improved method for preparing cationically-conductive, crystalline, articles of manufacture comprising a polycrystalline structural lattice consisting essentially of ions of aluminum and oxygen in crystal lattice combination and alkali metal cations that migrate in relation to said lattice under influence of an electric field. It is also concerned with the unique products of this method.

The preparation and use of cationically-conductive structures comprising a structural lattice consisting essentially of ions of aluminum and oxygen in crystal lattice combination and alkali metal cations which migrate through said lattice have been disclosed by Joseph T. Kummer and Neill Weber in copending United States patent application Ser. No. 563,938 which is now Patent No. 3,404,036. These structures can be used as cation conductors in a variety of devices which are electrically and/or electrochemically actuated. They are particularly adapted for use as half-cell separators in batteries employing molten alkali metal as a reactant.

It has been disclosed that these structures can be formed from crystals prepared by heating together $Na_2O$ and $Al_2O_3$. The $Na_2O$, which may be introduced as $Na_2CO_3$, etc., comprises about 4 to about 16, preferably about 8 to about 12, mol percent of the mixture of oxides. Unitary objects may then be formed by admixing the crystals thus prepared with a suitable binder, compressing the bound crystals, advantageously at pressures above about 5,000 p.s.i. and commonly between about 10,000 and 110,000 p.s.i., into the shape and size of the object desired, heating the compressate gradually, e.g. to about 500°–600° C., to remove the binder, and sintering the compressate. It has been conventional to heat the mixed oxides at temperatures in excess of about 1650° C. and to sinter the compressate at temperatures above about 1700° C. Other alkali metal cations, e.g. lithium, potassium, etc., can then be substituted for the mobile sodium ions, if desired.

If such oxides are heated at crystal forming temperatures above about 1550° C. or the crystals are sintered at temperatures above about 1550° C., the sintered product assumes a given crystalline structure. This temperature can be advanced about 50°–100° C. by heating in a closed atmosphere in the presence of excess extraneous sodium ion. A time temperature relationship for providing complete conversion to this crystalline structure comes into operation once the minimum conversion is reached.

If the crystals are prepared in this manner, they may be sintered into unitary objects of relatively high conductivity at temperatures above about 1400° C. If, however, the crystals are prepared at lower temperatures using the same starting materials, a different crystalline structure is formed. If such crystals are sintered in the higher temperature range, they convert to the first mentioned crystalline form. This change in crystalline structure during the sintering process has been found to be undesirable in that it results in crystalline objects which may distort in shape, crack, or, at best, provide inconsistency in the degree of ionic conductivity.

On the other hand, it has been discovered that if the crystals are formed at the lower temperature and sintered at a temperature insufficient to effect a significant amount of crystal transformation, objects of superior physical integrity and/or conductivity can be produced.

In accordance with this invention, both crystal forming and sintering are effected at a temperature and/or time-temperature unit below that required for crystal transformation. Thus, crystal forming is effected at temperatures above about 900° C. and below 1650° C., below about 1550° C. when formed in the absence of conversion inhibiting amounts of extraneous sodium ion, advantageously between about 1000° C. and 1500° C. Sintering is effected at temperatures below the same upper limits and above the minimum sintering temperature under the conditions provided. At substantially atmospheric pressure sintering is advisedly effected at temperatures above about 1400° C., advantageously between about 1450° C. and about 1550° C., preferably between about 1500° C. and about 1540° C.

This invention will be more fully understood from the following examples when read in conjunction with the accompanying drawings, wherein.

EXAMPLE 1

Cylindrical pellets were formed from oxides of sodium and aluminum in accordance with the following procedure:

(1) In powdered form $Na_2O$ (introduced as $Na_2CO_3$) and $Al_2O_3$ were added to a vessel and mechanically mixed for 30 minutes. The $Al_2O_3$ employed was in the form of 0.05 micron particles.

(2) The mixture was heated at 1250° C. for one hour to form crystals.

(3) The sample was mixed with a wax binder and mechanically pressed into pellets.

(4) The pellets were then isostatically pressed at 90,000 p.s.i.

(5) The wax binder was removed by gradually heating the pellets to about 550° C.

(6) The pellets were sintered in an electric furnace. During sintering the pellets were kept in a covered crucible in the presence of packing powder of the same composition as the powders from which the crystals were prepared.

(7) The pellets were weighed and physically measured.

(8) The electrical resistivities of the pellets were measured in the following manner:

(a) The flat opposing surfaces of the sample to be measured were first painted with a saturated solution of silver iodide in ethylenediamine. The pellet was then heated to 400° C. to remove the ethylenediamine, leaving the silver iodide as a smooth adherent layer. The silver iodide was then covered with silver paint to insure good electrical contact. The resistance was measured at 300° C. using 1.5 mc. alternating current and the resistivity was calculated.

The weight percent composition of $Na_2O$ and $Al_2O_3$ prior to sintering, the sintering time and temperature, the density of the sintered pellets and their specific resistivity are set forth in the following table.

jects prepared from $Li_2O$, $Na_2O$ and $Al_2O_3$ and disclosed in my copending patent application, Ser. No. 595,707 filed of even date with this application. With the lithium oxide containing materials, it was found that reconversion to the original crystal pattern could be obtained by heating the converted crystalline structure at temperatures below the conversion emperature in a closed atmosphere in the presence of excess sodium ion.

EXAMPLE 3

Figure 3:
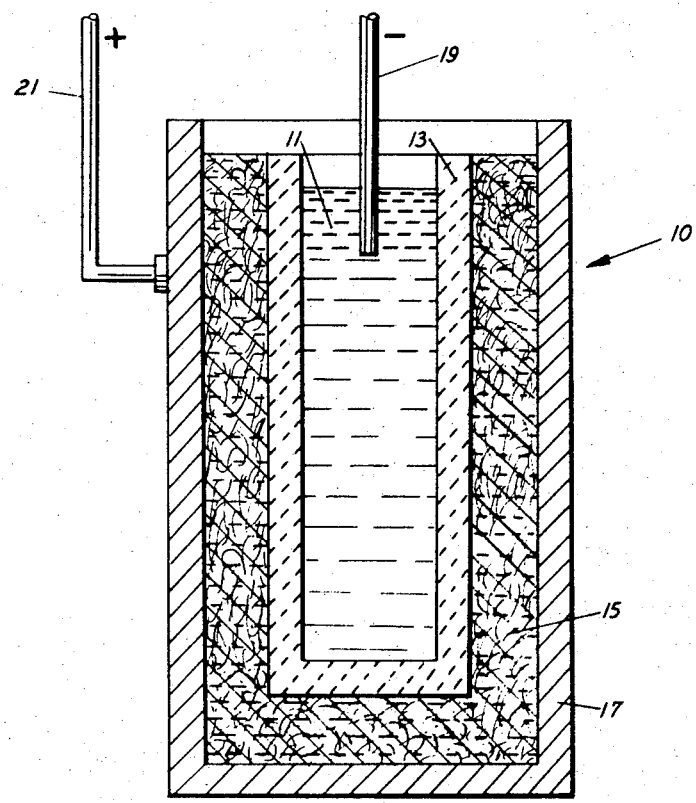
FIGURE 3 is a schematic drawing of a cell or battery illustrating use of a product of this invention as a half-cell separator.

Referring now to FIGURE 3, there is shown a cell 10 which may be one unit of a plurality of cells in series and/or parallel forming a battery. In this embodiment, an anode-reactant, molten sodium 11, is shown within a sodium ion-containing tube 13. In contact with the exterior of tube 13 is a porous conductor 15 immersed in a TABLE 1.—ELECTRICAL RESISTIVITY OF POLYCRYSTALLINE BI-METAL OXIDES FROM $NA_2O$ AND $AL_2O_3$

| | Wt. Percent Individual Oxides Used in Preparation | | Sintering Conditions | | Density (g./cc.) | Specific Resistivity, (ohm-cm.) 301° C., 1.5 megacycles |
|---|---|---|---|---|---|---|
| | $Na_2O$ | $Al_2O_3$ | Time (hours) | Temp. (° C.) | | |
| Group A | 8 | 92 | 16 | 1,500 | 2.60 | 33.7 |
| | 8 | 92 | 16 | 1,520 | 2.71 | 32.8 |
| | 8 | 92 | 16 | 1,530 | 2.78 | 30.7 |
| | 9 | 91 | 16 | 1,520 | 2.68 | 38.3 |
| | 9.91 | 90.09 | 17 | 1,520 | 2.85 | 33.4 |
| | 10 | 90 | 16 | 1,500 | 2.91 | 32.2 |
| | 11 | 89 | 16 | 1,500 | 2.95 | 33.5 |
| Group B | 9.91 | 90.09 | 3 | 1,450 | 2.75 | 53.5 |
| | 9.91 | 90.09 | 3 | 1,480 | 2.73 | 52.4 |
| | 9.91 | 90.09 | 3 | 1,500 | 2.91 | 37.0 |
| Group C | 9.91 | 90.09 | 17 | 1,520 | 2.85 | 33.4 |

Figure 1:
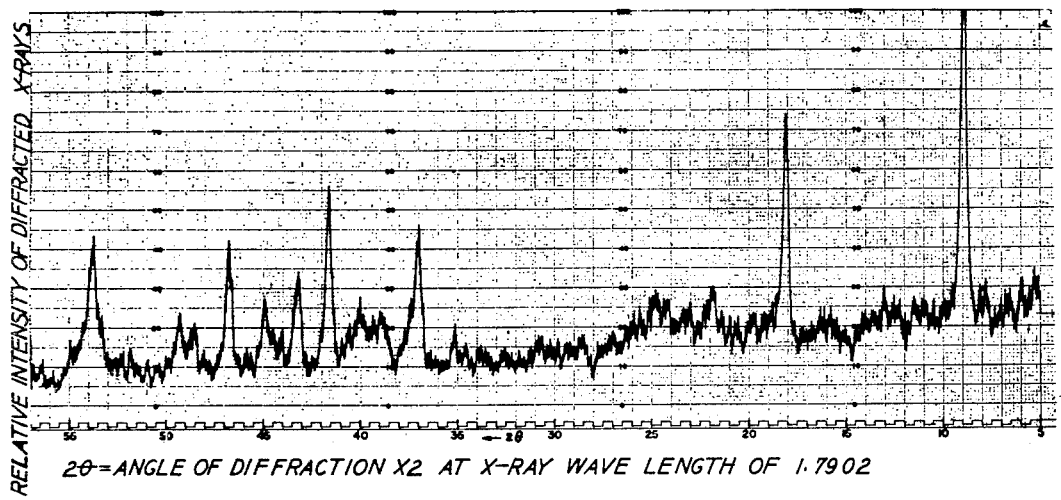
FIGURE 1 is a photograph of a recording which translates into graphic form a defined portion of an X-ray diffraction powder pattern characteristic of the cationically-conductive objects of this invention.
Figure 2:
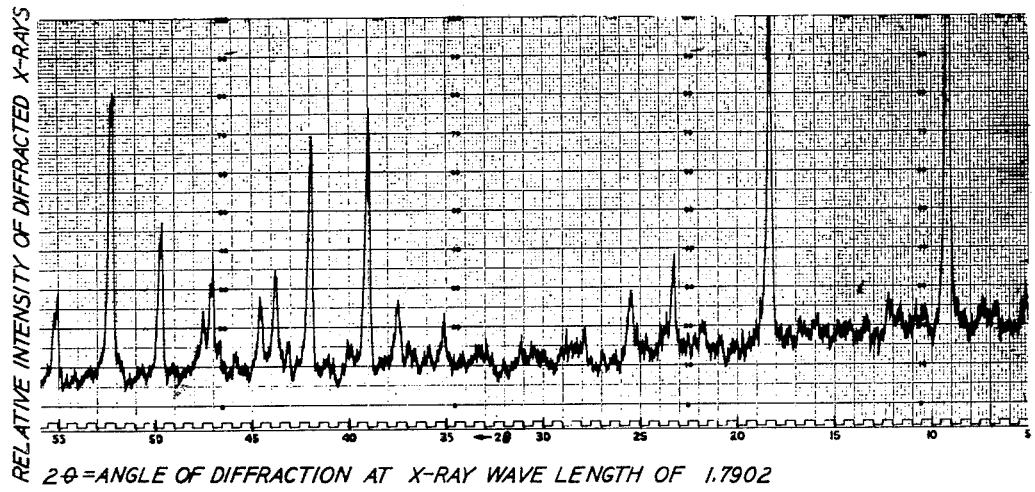
FIGURE 2 is a photograph of a recording which translates into graphic form a defined portion (corresponding) of an X-ray diffraction powder pattern characteristic of a cationically-conductive object prepared in like manner but sintered at higher temperatures.

The materials prepared in accordance with this invention, i.e. sintered without conversion of crystalline structure were crushed and subjected to testing. An X-ray diffraction powder pattern was obtained from the material using a cobalt tube (X-ray wave length of about 1.7902 A.). The pattern obtained and recorded in graphic translation is shown in FIGURE 1. The materials prepared in this manner but sintered at higher temperatures than employed in the method of this invention were tested in the same manner and the pattern obtained is shown in FIGURE 2. It will be noted that the former is characterized by an intensity peak at 53.5°–54° while that of the latter, the pattern characteristic of sodium beta-alumina, is characterized by peaks at 52°–53° and at 55°–56° but does not demonstrate the peak at 53.5°–54.5°. The angles mentioned herein refer to 2 theta, i.e. twice the angle of diffraction.

EXAMPLE 2

Crystals were prepared as in the preceding example with 9.75 wt. percent $Na_2O$ (introduced as $Na_2CO_3$) and 90.25 wt. percent $Al_2O_3$. After the oxide powders were heated together at 1250° C. for one hour, samples were subjected to X-ray diffraction analysis as in the preceding example. The X-ray diffraction powder pattern obtained corresponded to that of FIGURE 1.

Pellets were prepared from a remainder of these crystals using the method of the preceding example. When they were ready for the sintering step, the pellets were heated at 1600° C. for 3 hours in a loosely covered crucible which contained no supplementary supply of sodium ion. A sample pellet was then tested by X-ray diffraction as before and the pattern obtained corresponded to that of FIGURE 2, indicating complete or substantially complete conversion of crystalline form. A sample pellet was then placed in a platinum crucible imbedded in $$Na_2O \cdot Al_2O_3$$

and the crucible was tightly covered. It was heated at 1420° C. for 16 hours and then crushed and tested by X-ray diffraction as before. This sample retained the pattern of FIGURE 2 indicating that reconversion was not obtained. This behavior is opposite that of crystalline obsulfur-comprising, cathodic reactant-electrolyte. Encasing both 13 and 15 is a metal case, cathode 17. Inside tube 13 in contact with the molten sodium 11 is a conductor 19, e.g. platinum wire, which serves as the negative lead to an external circuit, not shown, which includes a resistance, e.g. a light bulb, D.C. motor, etc., and is in electrical connection with a positive lead, conductor 21. Lead 21 is in electrical contact with cathode 17. The cell may be operated under a blanket of inert gas or suitably sealed by a cover, not shown. The sodium atoms of the anode-reactant 11 yield electrons to the conductor 19 and pass as ions through tube 13 to the cathodic reactant, e.g. $Na_2S_5$ in 15. Sulfur atoms within 15 accept electrons from the external circuit via cathode 17 and the porous conductor of 15.

The porous conductor of 15 may be fibrous sheet material fabricated from graphite or carbon fibers and woven into cloth or felted, porous carbon plates, etc. One example of such materials is disclosed by Lauzos et al. in U.S. Patent 3,214,647.

The metal cathode 17 should be formed of a metal or alloy that resists attack by the sulfur-comprising cathodic reactant, e.g. aluminum lined or coated with chromium, titanium, chromel, etc.

The tube 13 is prepared in the same manner as the pellets of the preceding examples except that the crystals and wax binder are packed into a mold of corresponding shape prior to compression, e.g. between a tubular rubber mold and a metal core.

For a discussion of conventional X-ray diffraction composition characterization techniques, see "Elements of X-Ray Diffraction" by B. D. Cullity, Addison-Wesley Publishing Co., Inc., Reading, Mass., 1956, Library of Congress Catalog No. 56–10137, particularly "Chapter 7—Diffractometer Measurements." See also, "An Introduction to Crystallography" by F. C. Phillips, John Wiley & Sons, Inc., New York, N.Y.

It is to be understood that this invention is not limited to the examples herein shown and described but that changes and modifications may be made without departing from the spirit and scope of the invention, as defined in the appended claims.

I claim:
1. A cationically-conductive, polycrystalline unitary object consisting essentially of structural lattice consisting essentially of ions of aluminum and oxygen in crystal lattice combination and sodium ions which migrate in relation to said structural lattice under influence of an electric field and further characterized by an X-ray diffraction powder pattern having an intensity peak at an angle of 53.5°–54.5° when the X-ray wave length is about 1.7902 A. and said angle represents twice the angle of diffraction.

2. A cationically-conductive, polycrystalline, unitary object consisting essentially of structural lattice consisting essentially of ions of aluminum and oxygen in crystal lattice combination and sodium ions which migrate in relation to said structural lattice under influence of an electric field and further characterized by an X-ray diffraction powder pattern having as its major intensity peak between the angles of 50° and 60° a peak located intermediate the two major intensity peaks characteristic of the X-ray diffraction powder pattern of sodium beta-alumina between the angles of about 52° and about 56° when the X-ray wave length is about 1.7902 A. and all said angles represent twice the angle of diffraction.

3. A cationically-conductive, polycrystalline, unitary object consisting essentially of structural lattice consisting essentially of ions of aluminum and oxygen in crystal lattice combination and sodium ions which migrate in relation to said structural lattice under influence of an electric field and further characterized by an X-ray diffraction powder pattern crystallographically equivalent to the X-ray diffraction powder pattern of FIGURE 1.

4. The method for preparing a cationically-conductive polycrystalline object which comprises intimately mixing aluminum oxide and sodium oxide, said sodium oxide comprising about 5 to about 15 weight percent of said mixture, heating the resultant mixture of oxides at crystal-forming temperature in the range of about 900° to about 1550° C. until said mixture has been converted into a first cationically-conductive crystalline composition and terminating said heating before said first crystalline composition converts to a second crystalline composition, compressing the resultant crystals into an object of the desired shape and size, and sintering the resultant compressate at a temperature in the range of about 1400° to about 1550° C. and for a time sufficient to unite the individual crystals of said compressate into a unitary polycrystalline object and insufficient to effect conversion of the crystals to a second crystalline composition.

5. The method of claim 4 wherein said crystals are admixed with a volatilizable binder prior to compression and before sintering the temperature is gradually increased until volatilization of said binder is essentially complete.

6. The method of claim 4 wherein said crystal-forming temperature is in the range of about 1000° to about 1540° C. and said compressate is sintered at a temperature in the range of about 1400° to about 1550° C.

7. The method of claim 4 wherein said crystal-forming temperature is in the range of about 900° to about 1550° C. and said compressate is sintered at a temperature in the range of about 1450° to about 1550° C.

8. The method of claim 4 wherein said crystal-forming temperature is in the range of about 1000° to about 1500° C. and said compressate is sintered at a temperature in the range of about 1450° to about 1540° C.

9. The method of claim 4 wherein said crystal-forming temperature is in the range of about 900° to about 1540° C. and said compressate is sintered at a temperature in the range of about 1500° C. to about 1540° C.

10. The method of claim 4 wherein said sodium oxide comprises between about 8 and about 11 weight percent of said mixture.

11. The method of claim 4 wherein said crystals are compressed at a pressure in excess of about 5,000 p.s.i.

12. The method of claim 4 wherein said crystals are compressed at a pressure in the range of about 10,000 to about 110,000 p.s.i.

References Cited

UNITED STATES PATENTS

| | | | |
|---|---|---|---|
| 3,311,482 | 3/1967 | Klingler et al. | 106—65 |
| 3,377,176 | 4/1968 | Wolkodoff et al. | 106—46 |
| 3,404,036 | 10/1968 | Kummet et al. | 136—6 |

WINSTON A. DOUGLAS, Primary Examiner

D. L. WALLTON, Assistant Examiner

U.S. Cl. X.R.

106—46, 65; 136—6